(12) United States Patent
Morotto et al.

(10) Patent No.: US 11,041,514 B2
(45) Date of Patent: Jun. 22, 2021

(54) HYDRAULIC DISTRIBUTOR WITH VALVE DEVICE WITH ACTIVE DISCHARGE IN LOAD SENSING CIRCUITS

(71) Applicant: WALVOIL S.P.A., Reggio Emilia (IT)

(72) Inventors: Amedeo Morotto, Reggio Emilia (IT); Davide Mesturini, Reggio Emilia (IT)

(73) Assignee: WALVOIL S.P.A., Reggio Emilia (IT)

( * ) Notice: Subject to any disclaimer, the term of this patent is extended or adjusted under 35 U.S.C. 154(b) by 232 days.

(21) Appl. No.: 15/910,504

(22) Filed: Mar. 2, 2018

(65) Prior Publication Data

US 2018/0258614 A1 Sep. 13, 2018

(30) Foreign Application Priority Data

Mar. 2, 2017 (IT) .......................... 102017000023749

(51) Int. Cl.
*F15B 21/04* (2019.01)
*F15B 11/16* (2006.01)
(Continued)

(52) U.S. Cl.
CPC ............ *F15B 21/04* (2013.01); *E02F 9/2225* (2013.01); *F15B 11/165* (2013.01); *F15B 13/06* (2013.01);
(Continued)

(58) Field of Classification Search
CPC .... F15B 13/0402; F15B 11/165; F15B 13/06; F15B 21/042; F15B 13/0871;
(Continued)

(56) References Cited

U.S. PATENT DOCUMENTS 3,978,998 A * 9/1976 Klitz ....................... E02F 9/123
414/687
3,991,571 A * 11/1976 Johnson ................ E02F 9/2239
60/422

(Continued)

FOREIGN PATENT DOCUMENTS

EP  1253327 A1  10/2002
EP  2351936 A1  8/2011

OTHER PUBLICATIONS

Search Report in related application IT201700023749 dated Dec. 13, 2017.

(Continued)

*Primary Examiner* — Jessica Cahill
(74) *Attorney, Agent, or Firm* — Kristina Castellano; Castellano PLLC

(57) ABSTRACT

A distributor (3) of the closed-center, load sensing type, connected to a variable displacement pump (1) comprises a valve device (10, 110), composed of a logic element, which is pilot-operated and configured to bring a high-pressure channel (2) into communication with a low-pressure channel (4), the connection being usually opened by the combined action of an equivalent pressure generated by an elastic member (12) and a counter-pressure which is generated, under operative conditions, in the low-pressure channel (4). The connection is closed in a switching position and it is pilot-operated to a closure position by the combined action of a high-pressure signal (P) and a load sensing signal (LS).

13 Claims, 7 Drawing Sheets

(51) Int. Cl.
  *E02F 9/22* (2006.01)
  *F15B 13/06* (2006.01)
  *F16K 11/07* (2006.01)
  *F16K 11/06* (2006.01)
  *F15B 13/08* (2006.01)
  *E02F 3/34* (2006.01)

(52) U.S. Cl.
  CPC ............. *E02F 3/34* (2013.01); *F15B 13/0871* (2013.01); *F15B 2211/3111* (2013.01); *F15B 2211/41563* (2013.01); *F15B 2211/428* (2013.01); *F15B 2211/50536* (2013.01); *F15B 2211/528* (2013.01); *F15B 2211/66* (2013.01); *F15B 2211/851* (2013.01); *F16K 11/06* (2013.01); *F16K 11/07* (2013.01)

(58) Field of Classification Search
  CPC .... F15B 2211/3111; F15B 2211/41563; F15B 2211/428; F15B 2211/50536; F15B 2211/528; F15B 2211/66; F15B 2211/851; F16K 11/06; F16K 11/0655; F16K 11/07; E02F 9/2225; E02F 3/34

USPC .......................................................... 137/102
  See application file for complete search history.

(56) References Cited

U.S. PATENT DOCUMENTS

| | | | | |
|---|---|---|---|---|
| 4,337,620 | A * | 7/1982 | Johnson | B62D 5/07 137/101 |
| 4,508,013 | A * | 4/1985 | Barbagli | E02F 9/2221 414/699 |
| 5,134,853 | A * | 8/1992 | Hirata | E02F 9/2225 60/420 |
| 6,397,591 | B1 * | 6/2002 | Tsuruga | F15B 11/162 60/422 |
| 10,619,632 | B2 * | 4/2020 | Kondo | F15B 11/00 |
| 2007/0095059 | A1 * | 5/2007 | VerKuilen | E02F 9/2296 60/468 |

OTHER PUBLICATIONS

Espacenet English language Abstract of EP1253327 (indicated as T5 document above), 2002.

* cited by examiner

HYDRAULIC DISTRIBUTOR WITH VALVE DEVICE WITH ACTIVE DISCHARGE IN LOAD SENSING CIRCUITS

CROSS REFERENCE TO RELATED APPLICATIONS

This application claims priority to Italian patent application 102017000023749 filed on Mar. 2, 2017, the contents of which are incorporated herein by reference.

APPLICATION FIELD

The invention is in the field of the hydraulic valve devices within directional control valves used in agricultural applications, such as in "front loader" vehicles.

The invention relates to a hydraulic distributor, with a closed center and multiple working sections, and comprising a logic discharge element.

According to an implementation example said logic element is an adjusting device.

The invention also relates to the above-mentioned discharge adjusting device configured to be associated with a hydraulic valve distributor with multiple sections, particularly on the inside thereof.

More specifically, said discharge adjusting device is a pilot-operated valve with differential areas.

The driving of said valve having differential areas is carried out by different pressure "signals" of connection channels inside the distributor.

STATE OF THE ART

In industrial and agricultural applications, such as those of front loaders, a known problem is that of an even heating of the hydraulic distributor. In fact, said vehicles are often left outdoors overnight and/or during the winter season. Upon its actuation, the distributor has a temperature that is equal to that of the outer environment; often, before actuating said distributor, it is necessary to translate the vehicle for a few kilometers. The drive oil, which is the same one used for the hydraulic application of the front loader, heats until reaching temperatures above 100° C. In the case the distributor is of an open center type, through a free circulation, the oil flows through the same distributor and allows a gradual heating thereof.

On the contrary, in the case the distributor is of a conventional closed-center type, the body is passed through by hot oil only upon the first actuation of at least one hydraulic section thereof. In this condition, it turns out that the hot oil contacts zones and components of the distributor itself that are still cold with a high temperature differential, compared to that of the same oil used in the transmission. Local deformations of the components are triggered, due to the different thermal expansion coefficients and the different geometries of the components.

Therefore, upon the first actuations, it is usual that a blocking of the distribution spool occurs in such positions whereby the flow rate continues to be delivered without the operator being able to bring it back to a central position, resulting in a considerable risk in the safety of the operator him/herself, but also for the working environment and the surrounding people.

In the prior art, such problem is solved for said applications by inserting a discharging valve located in by-pass to the delivery line of a closed-center, load sensing distributor that discharges to the low-pressure line, passing through the whole distributor, a part of the flow rate delivered by the pump until when it is switched to close by the signal of the delivery pressure exceeding a predetermined threshold dictated by a spring opposite the active area on which said signal acts.

Since, in agricultural applications the stand-by pressure (or margin) of the LS pump supplying the system can be very high (even up to 60 bar), the switching pressure of the discharging valve has to be of slightly higher than the stand-by margin pressure itself.

When at least one utility is actuated, upon which a low load, or a load for small openings acts, and since the oil keeps flowing towards the low-pressure line through the discharging valve until the switching thereof is completed, it is necessary that the pump sends a higher flow rate than that required by the same utility.

OBJECT OF THE INVENTION

An object of the present invention is to provide to the art a closed-centre, load sensing distributor which allows improving the known solutions in the context of a rational, simple, and rather cost-effective solution.

A further object of the present invention is to provide a hydraulic distributor, of the closed-center, load-sensing type, which can obviate one or more of the drawbacks defined with reference to the prior art.

It is also an object of the present invention to provide a hydraulic closed-center distributor which is less prone to problems of an uneven temperature distribution.

Such and other objects are achieved by virtue of the characteristics of the invention set forth in the independent claim 1. The dependent claims outline preferred and/or particularly advantageous aspects of the invention.

Particularly, an embodiment of the present invention provides a logic element configured to send to the low-pressure line, passing through the whole distributor, a flow rate dispensed by the pump to minimize the temperature differential between the distributor body and the oil used under a non-operative condition of the spool that adjust the oil distribution towards the actuations.

A further object of the invention is also to minimize the dissipation of the flow rate delivered in the case that at least one hydraulic utility requires oil for the pump and the load present at the utility is minimum or the opening of the adjusting cursor is reduced.

An embodiment provides to the art a logic element composed of at least one bi-directional, two-position pilot-operated slide 2, on which, on the one hand, a spring, or another equivalent elastic member, and the discharge pressure act, while, on the other hand, both the oil delivery pressure and the load sensing pressure present at the utilities act (once at least one section has been actuated).

Preferably, said oil delivery pressure and said load sensing pressure act on two corresponding active areas of the logic element.

In one embodiment, the valve device element is a logic element connectable on the outside of the distributor body.

A further object of the invention is to solve the problem whereby, under some operative conditions, the LS pressure remains trapped along its own channel even if no utility has been actuated.

Said misfunctioning may cause an abnormal adjustment of the pump LS and the logic element itself.

In order to solve such drawback, a further embodiment of the invention uses a logic element adapted to:

again, create the connection between the abovementioned high and low-pressure lines, and at the same time, create a second connection configured to join, in the usually open condition of the logic element, the chamber of the LS signal with the low-pressure line, closing when the logic element (slide) is actuated.

In the context of such aspects, a first advantage of the present invention is as follows: when the slide is open, the distributor is heated through an oil flow rate which passes through it, generated by the pump at the stand-by pressure (i.e. only of the margin) of the pump itself.

A further advantage is that the double driving on the logic element, in which the LS signal coming from the utilities is also present, and which acts on the active area of said element, allows a switching at a lower pressure. Therefore, a lower power dissipation follows, given by the product between the flow rate discharged through the valve and the delivery pressure.

A further advantage is that, when, as a by-pass to the delivery of the pump, also a second distributor is inserted in addition to the closed-center LS distributor, as it is the case, for example, in agricultural applications (rear distributor), the operation of the distributor which is the subject-matter of the invention is not subjected to operative alterations, thus maintaining/ensuring the same functional advantages. Under such condition, the logic element is pilot-operated to close (chamber opposite the spring) only by the signal of the delivery pressure on its own active area.

Another advantage is that it is possible to solve the problem whereby, under some operative conditions, the LS pressure remains trapped along its own channel, even if no utility has been actuated.

Such objects and advantages are all achieved by the valve device, which is the subject-matter of the present finding, which is characterized by that is provided for in the claims set forth below.

BRIEF DESCRIPTION OF THE FIGURES

This and other characteristics will be more pointed out by the following description of some embodiments that are illustrated, by way of non-limiting example only, in the attached drawing tables.

DETAILED DESCRIPTION OF PREFERRED EMBODIMENTS

Figure 1:
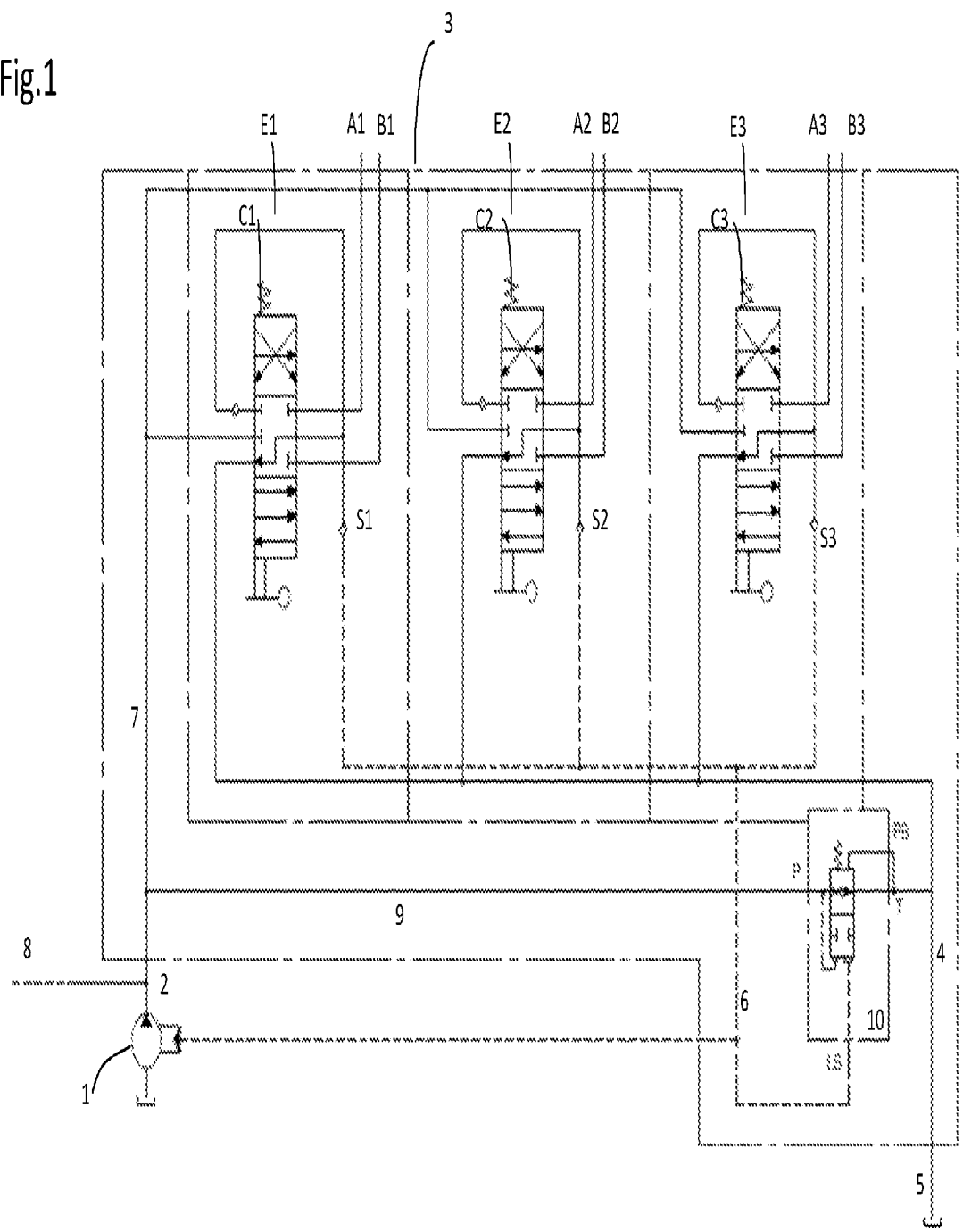
FIG. 1 illustrates the hydraulic scheme of the system in which the valve device which is the subject-matter of the invention is inserted.

With reference to FIG. 1, an operative example of a hydraulic circuit of a distributor comprising a valve device in accordance with the invention is illustrated.

The circuit is composed of a variable displacement pump 1, connectable to a closed-center, load sensing distributor generally indicated by the reference number 3. The connection between the pump and the distributor takes place via a high-pressure channel 2, formed by a series of corresponding conduits.

In a possible embodiment, the load sensing distributor 3 is schematized by a dashed line, and it is provided with three general sections E1, E2, and E3, each of which controls a corresponding actuator through the utilities A1, B1, A2, B2, A3, and B3.

Each section E1, E2, E3 comprises therein at least one slide C1, C2, C3 and, preferably, at least one selector S1, S2 and S3 configured to capture the highest signal LS among all the utilities. Therefore, via a channel 6 the signal LS is sent to the pump 1, which provides the flow rate to the system based on its own margin, i.e., the stand-by pressure of the pump.

The distributor 3 also comprises a low-pressure channel 4, through which the oil is discharged from the utilities, for example, into a tank 5.

In one embodiment, the first high-pressure channel 2 inside the distributor is divided into a first delivery line 7 is adapted to connect the pump to the sections of the distributor E1, E2 and E3, and a second line 9 suitable to pass through the entire distributor before reaching a valve device 10, the characteristics of which will be best specified herein below. Preferably, also a third line 8 is present, which is suitable to connect the high-pressure channel to an outer distributor, not shown in the figure, arranged in another part of the vehicle.

Figure 2:
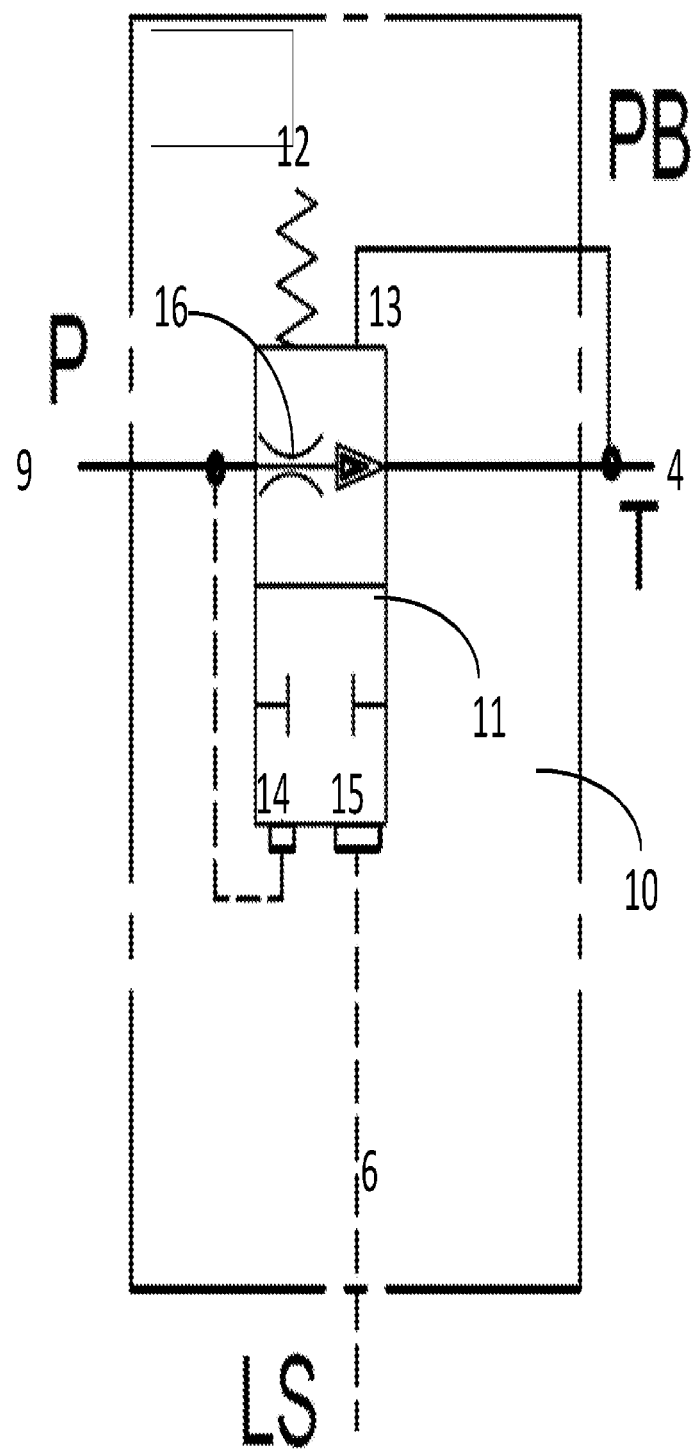
FIG. 2 illustrates the hydraulic scheme of the valve device and the corresponding distributor which is the subject-matter of the invention.
Figure 3:
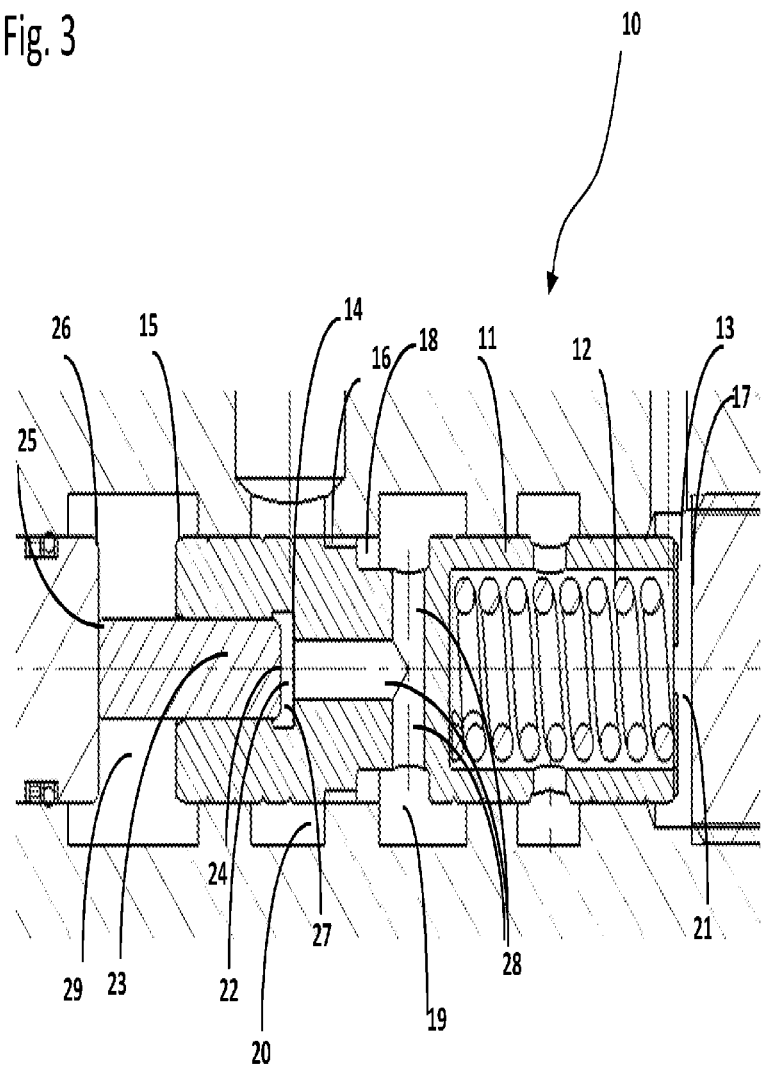
FIG. 3 illustrates a sectional view of the valve device used in the distributor which is the subject-matter of the invention.
Figure 4:
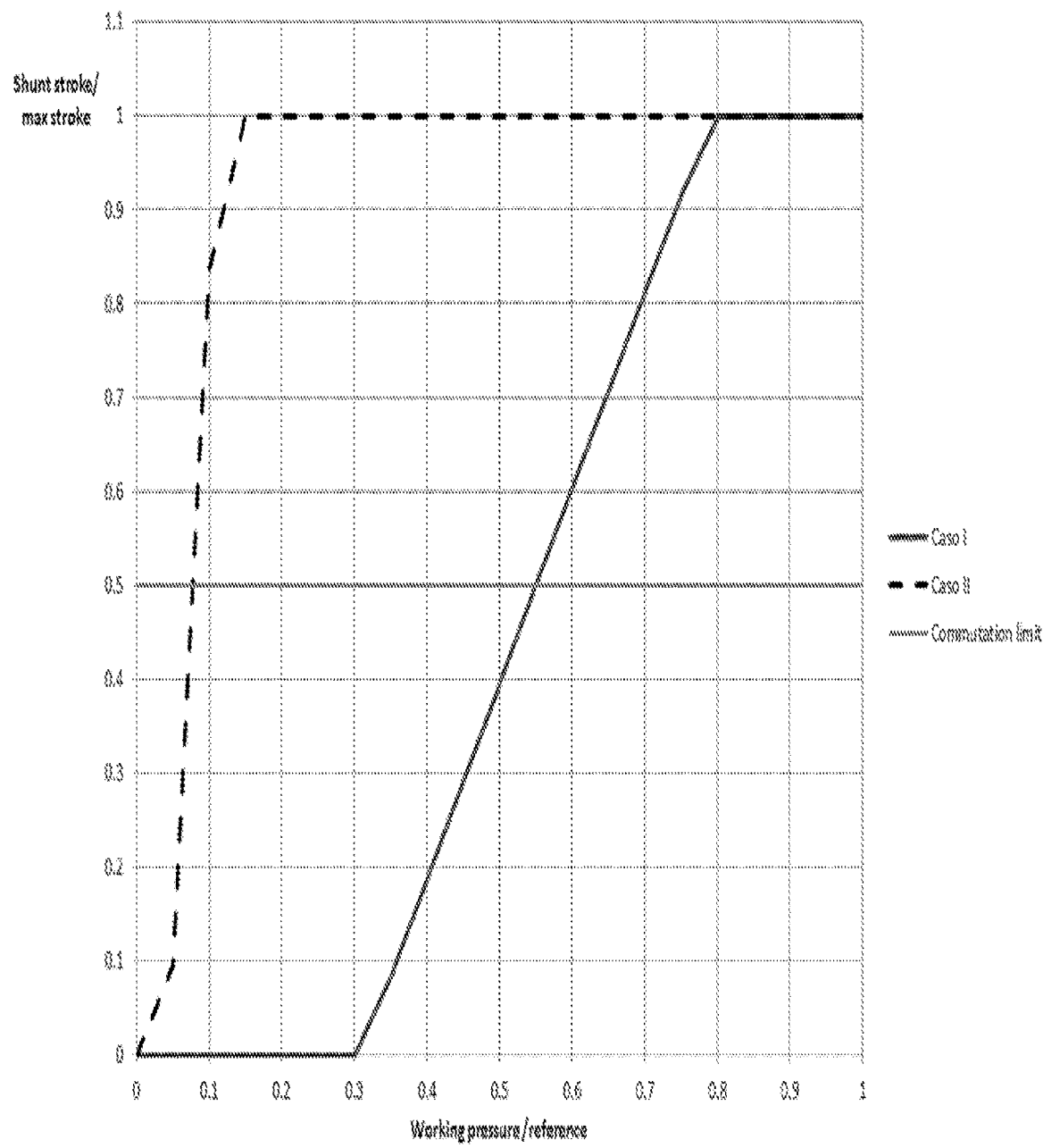
FIG. 4 illustrates the adjustment curve of said device.

With reference to FIGS. 2 and 3, the valve device 10 comprises a cursor 11, preferably of the bi-directional type with continuous positioning, housed in a respective valve body.

In one embodiment, the valve body is defined inside the body of the distributor itself. However, it will be appreciated that, alternatively, the valve device 10, 100 may be formed by a logic element attachable to the outside of the distributor body and, therefore, having a distinct body.

As it can be seen from FIG. 3, the cursor 11 is pushed to open by an elastic member 12, such as a spring, and by the pressure PB that is present on the low-pressure line 4. According to a preferred embodiment, the pressure PB that is present on the low-pressure line 4 acts onto a first surface 13.

Furthermore, the cursor is pushed to close by the pressure P that is present on the second high-pressure line 9 and by the LS pressure that is present in the respective channel 6.

According to an aspect of the invention, the equivalent switching pressure of the slide through the compression of the spring 12 with just the pressure present in the line 9 is higher than the stand-by pressure of the pump.

The high-pressure signal P present in the second high-pressure line 9 and the load sensing signal (LS) in the respective channel 6 act on respective areas 14, 15. Preferably, the two areas are located on a same side, opposite the one of the first surface 13. The sum of the areas 14, 15 is equal to the area of the first surface 13.

In other words, the surfaces 14 and 15 are located on a same side, while the surface indicated with 13 is on the opposite side of the slide cursor 11.

While the size of the area of the driving surface 13 is indicated by A13, the size of the area 14 is indicated by A14 and the size of the area 15 is indicated by A15, the ratios between the areas are preferably such that:

$$A13 = A14 + A15, \text{ where}$$

$$A15 > A14$$

I.e., the area A13 of the driving surface 13 is equal to the sum of the areas 14 and 15, considering the constraint that the area 15 is larger than the area 14.

In one embodiment, the cursor 11 is slidable in a hole 18 obtained inside the valve body or, more generally of the distributor 3. Consequently, the corresponding section of the hole corresponds to the area A13 of the first surface 13.

According to a preferred embodiment, two recesses 19 and 20, preferably having an annular shape, are present in the hole 18.

A first recess 19 is configured to receive the pressurized fluid via the high-pressure channel 2 (and via its second channel 9) supplied by the pump 1.

A second recess 20 is connected with the low-pressure channel 4 at the tank 5.

Usually, the cursor 11, i.e. when it is in a non-operative configuration, keeps the connection between the recesses 20 and 19 open, preferably through a throttled passage 16. The opening is obtained by the combined action of the spring 12 and the PB pressure in a corresponding chamber 21. It should be noted that, in the context of the present invention, by the term throttled is meant that the passage defines a narrowing to the fluid, thereby allowing the passage inside thereof in a calibrated and controlled manner.

According to a preferred embodiment, the chamber 21 which is obtained at the end of the surface 13 and the abutment 17 thereof is obtained on the spring 12 side.

In one embodiment, inside the cursor 11 a hole 22 parallel to the same axis of the cursor 11 (on the side opposite the surface 13) is obtained, and defines the area 14 mentioned above.

As it can be seen from the figures, a piston 23 can slide in the above-mentioned hole 22, which has two surfaces at the ends thereof, a first surface indicated by 24 facing the side of the cursor 11, and a second surface indicated by 25 facing the side 26 of the abutment of the cursor 11 opposite the spring.

In one embodiment, the piston 23 defines a further chamber 27 between the first surface 24 and the area 14 on which the pressure P acts, by virtue of one or more holes 28, preferably inside the slide 11, which connect it with the recess 19.

The area 15 of the cursor 11 and the second surface 25 of the piston 23 together with the abutment 26 inside the hole 18, define a chamber 29 to which the LS pressure arrives.

According to a further aspect, one or more throttled passages 16 are defined between the cursor 11 and the corresponding hole 18.

Under a stand-by condition, i.e., when no slide C1, C2, C3 is actuated, the LS pressure is null, thanks to the spring 12, therefore all the minimum flow rate passes through the valve device via the throttled passage 16. In this manner, the hot oil is allowed to evenly heat the whole distributor at the stand-by pressure of the pump.

Referring as F12 the switching force of the spring 12, the equilibrium of the slide 11 is given by the following relationship:

$$pP*A14+pLS*A15=F12+pPB*A13$$

where pP is the pressure present in the chamber 27, pLS the one in the chamber 29, and finally, pPB the one in the chamber 21.

Assuming the PB pressure as almost null, it follows that $$pP*A14+pLS*A15=F12$$

In order to switch the cursor 11 from the usual opening position, i.e. piston 23 on the abutment 26 and, in turn, in abutment on the cursor 11, at the closure position thereof, i.e. with the cursor 11 on the abutment 17, two distinct cases may exist. A first case I occurs with a null LS (the slides C1, C2 and C3 are not moved), in which a utility of the outer distributor is actuated along the line 8. In this manner, the pressure P increases until reaching the switching pressure value given by F12/A14. In this case, the cursor 11, upon moving, closes the passage 16 and it is switched to close. Therefore, all the oil is sent by the pump P along the high-pressure pump 8.

A second case II occurs by actuating at least one of the slides C1, C2 or C3 of the distributor 3. The LS pressure, which is the highest among those of the actuated utilities, directly acts on the area 15. In this case, the cursor 11, upon moving, closes the passage 16 and is switched to the closure position. Therefore, all the oil is sent by the pump along the first high pressure line 7.

Figure 5:
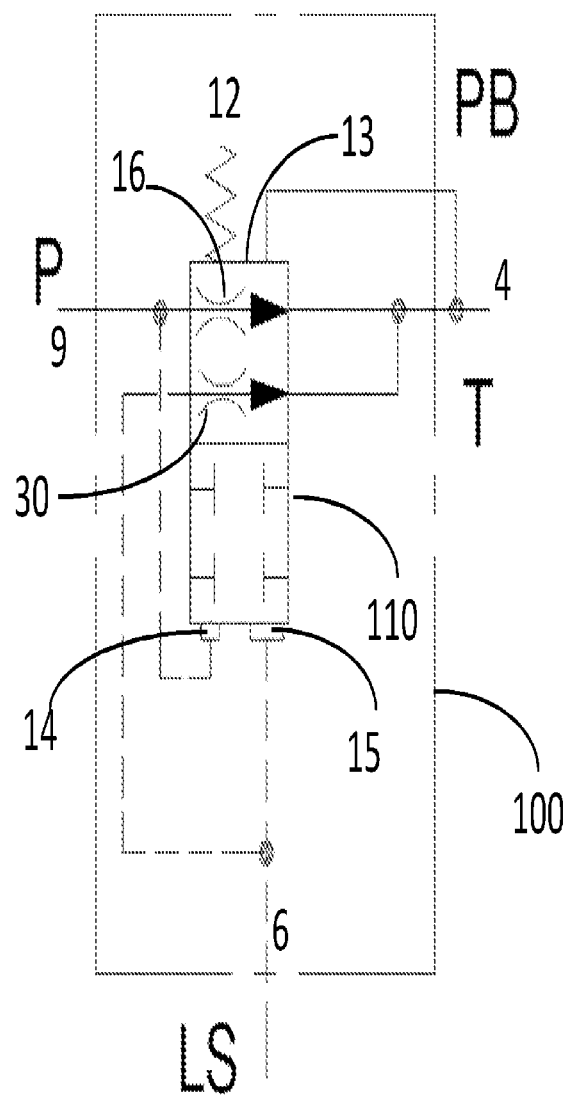
FIG. 5 illustrates the hydraulic scheme of a second embodiment of the valve device and the corresponding distributor which is the subject-matter of the invention.

As it can be seen from the graph in FIG. 5, not drawn in scale, in the case II a considerably lower pressure than the pressure needed is required to switch the valve device 10 to close compared to case I.

The operative advantages that are obtained are as follows:
by actuating at least one of the cursors C1, . . . or Cn and by driving the slide with the signal LS present in the channel 6, besides the signal P present in the second line 9, the percentage of power dissipated by the system, which is given by the oil flow which, through the cursor 11, is lower than that dissipated through said slide when the same flow rate is required from a general utility located along the third line 8 without actuating any slides C1 . . . or Cn.

by actuating at least one of the slides C1, . . . or Cn and by driving the cursor 11 with the LS signal present in the channel 6 besides the signal P present in the line 9, the percentage of power dissipated by the system, which is given by the oil flow that passes through the cursor 11 is lower than that dissipated through a similar device that carries out the same connection of the cursor 11, but which uses only the P signal to switch the cursor and does not involve the use of the LS signal, which acts on an active area thereof.

Intermediate conditions of the valve device 10 described can also be present, between the two cases given by the overlapping of the operation of the distributor 3 supplied by the first line 7 and the external one, supplied by the third line 8 and by the change in the margin by the pump according to the vehicle on which said hydraulic application is installed.

Figure 6:
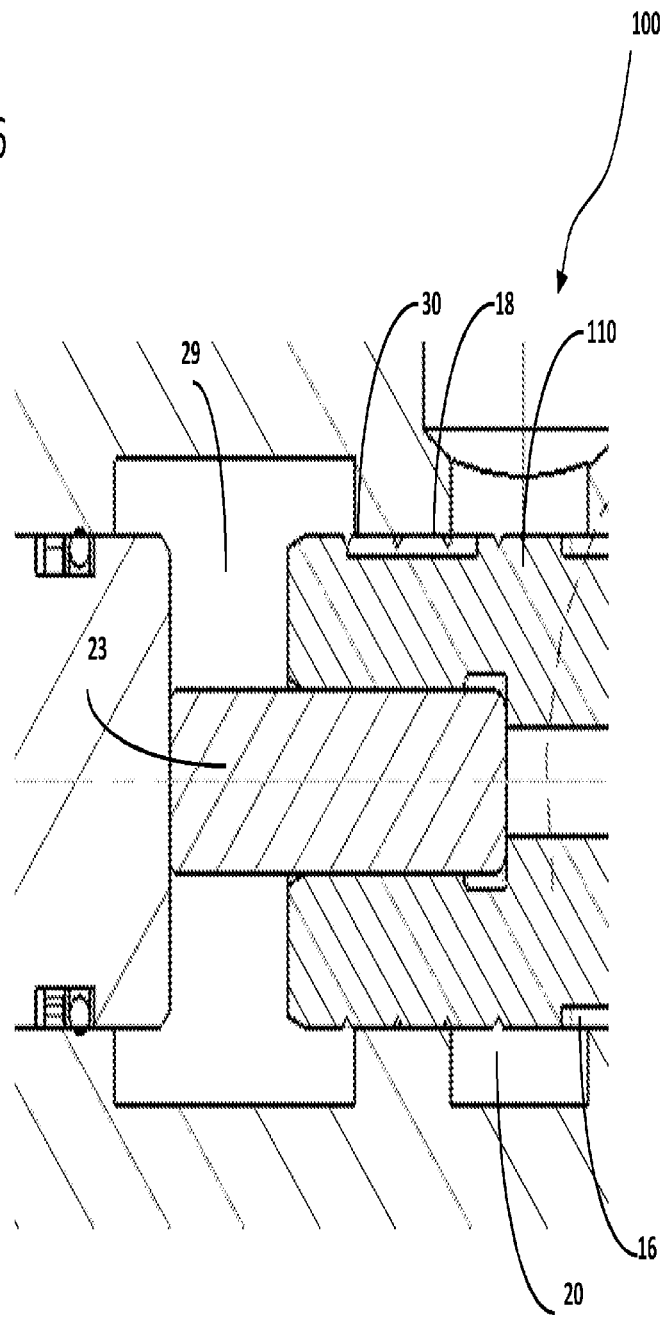
FIG. 6 illustrates a sectional view of the valve device of FIG. 5.

FIGS. 5 and 6 show a possible example or variation of the valve device in question.

Now the device is indicated with 100 and the cursor is indicated with 110.

The present implementation variation will be described only with reference to different aspects compared to the version described above. Therefore, the preferred embodiments described above will be applicable also to this case, unless otherwise stated.

The cursor 110 comprises one or more calibrate passages 30 which, under a usual opening condition, bring the chamber 29 connected to the LS line 6 into communication with the recess 20 connected with the low-pressure line. By virtue of such solution, the calibrated passage is suitable to discharge the LS pressure that could be trapped in the circuit even when the slides C1, C2 and/or C3 are not operated, causing a misfunctioning of the pump and/or of the same valve device 10.

When the cursor moves to the closure position, such connection is inhibited.

Preferably, the calibrated passage 30 is configured so that the connection between the chamber 29 and the recess 20 closes with a lesser stroke with respect to the one needed to carry out the switching of the slide 110, thus closing the connection through the throttled passages 16 between the recess 20 and the recess 19 connected to the high-pressure line.

In other words, the calibrated passage between the second high-pressure line 9 and the low-pressure channel 4 is configured to allow, even in a switching position, a controlled passage of fluid therebetween.

Figure 7A:
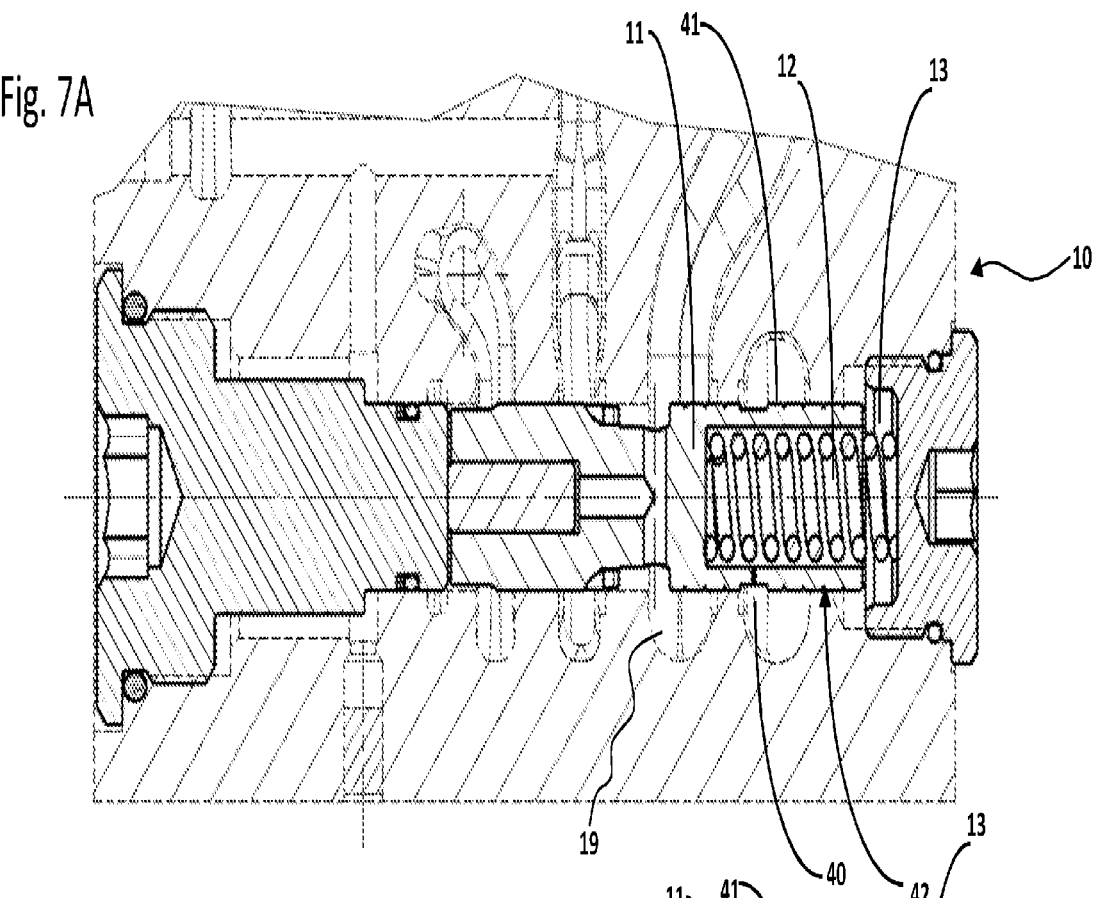
FIGS. 7A and 7B illustrate a sectional view of still another variation of the valve device, in two operative positions, used in the distributor of the present invention.
Figure 7B:
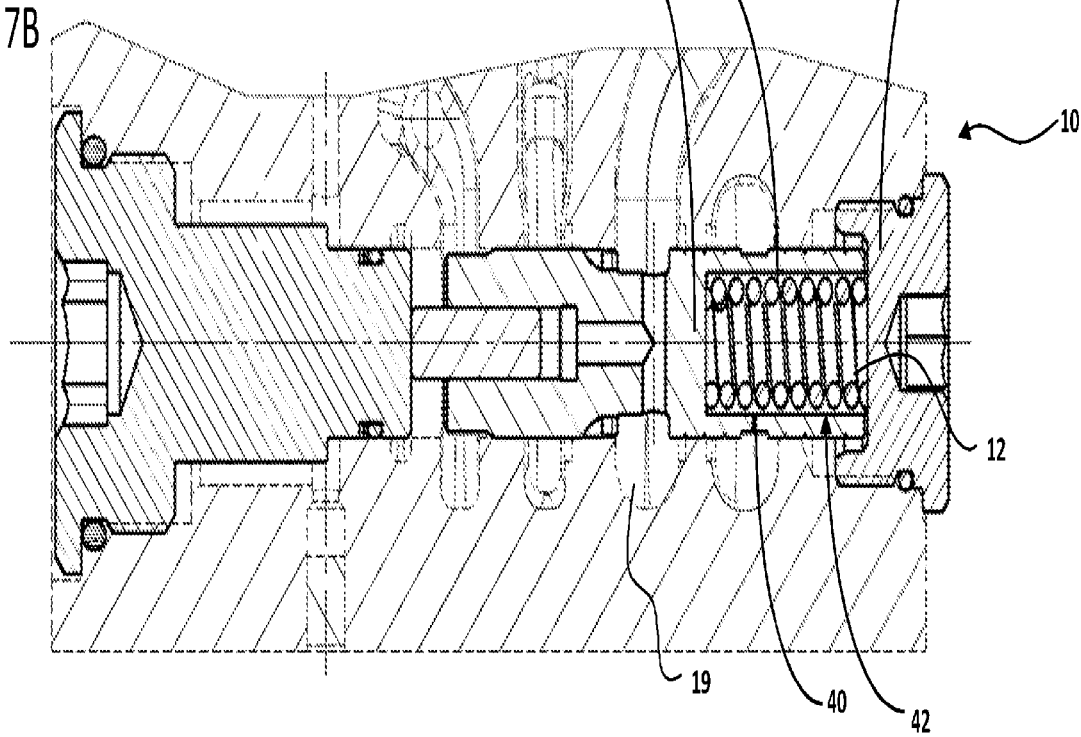

In FIGS. 7A and 7B, a further variation of the valve device of the present invention is illustrated.

In such embodiment, in which the valve device may have similar characteristics to those of the two previous embodiments, the cursor 11 has a further throttled passage 40 that brings the chamber 21, in which the counter-pressure PB of the low-pressure channel acts, in communication with a third annular recess 41 defined in the hole 18 and also connected with the low-pressure channel 4.

Preferably, the third recess 41 is defined between the recess 19 and the chamber 21. In one embodiment, the further throttled passage 40 brings the recess 41 and the chamber 21 into communication through a housing cavity 42 of the spring 12, which opens in the same chamber 21.

Thus, it will be appreciated that the further throttled passage 40 allows obtaining an advantageous damping effect during the switching of the cursor 11.

Therefore, the invention solves the proposed problem, while achieving a plurality of advantages, among which an improvement in the safety and reliability of the distributor is exhibited, particularly in the case of a start in cold settings, by virtue of the passage of oil even when the slides are not moved.

The invention claimed is:

1. A hydraulic distributor for closed-center, load sensing, hydraulic systems, comprising
   a. one or more working sections (E1 . . . En), each of which provides for a slide (C1 . . . Cn) that, if the one or more working section is actuated, causes a deviation of a flow from a first high-pressure line towards a connecting channel to a respective utility (A1,B1, . . . An, Bn), the first high-pressure line receiving a pressurized fluid from a pump,
   b. a second high-pressure line, arranged in parallel to said first high-pressure line, the second high-pressure line also receiving the pressurized fluid from the pump;
   c. a low-pressure channel, the low-pressure channel receiving the pressurized fluid discharged from the utility;
   d. a load sensing channel of a load sensing signal; comprising a valve device bringing said second high-pressure line into communication with said low-pressure channel by defining a connection between said second high-pressure line and said low-pressure channel; said connection being:
      normally open by the action of an elastic member and by a counter-pressure (PB) of the low-pressure channel,
      closed and driven to a switching position by a high-pressure signal (P) present in the second high-pressure line and by the load sensing signal in the load sensing channel,
   wherein said valve device comprises a cursor and wherein said elastic member and said counter-pressure of the low-pressure channel act on a first surface of said cursor.

2. The hydraulic distributor according to claim 1, wherein said cursor comprises a first side and a second side, the first surface being defined in the first side, the second side being opposite to the first side, wherein the second side comprises two areas, said high-pressure signal (P) in the second high-pressure line acting on a first area of the second side and said load sensing signal (LS) in the load sensing channel acting on the second area, the second side being opposite the side of the first surface, wherein a sum of said first area and second area is equal to a further area of the first surface on which said elastic member and said counter-pressure of the low-pressure channel act.

3. The hydraulic distributor according to claim 2, wherein said load sensing signal (LS) acts on said first area, and said high-pressure signal (P) acts on said second area, the first area being greater than the second area.

4. The hydraulic distributor according to claim 1, wherein said cursor is slidable in a hole obtained inside a main body of the valve device.

5. The hydraulic distributor according to claim 4, wherein two annular recesses are present in the hole, a first recess being configured to receive the pressurized fluid through the second high-pressure line, and a second recess being connected with the low-pressure channel, said cursor being configured to keep a connection between said recesses open.

6. The hydraulic distributor according to claim 5, wherein one or more throttled passages are defined between cursor and hole, which implement said connection between the two recesses.

7. The hydraulic distributor according to claim 1, wherein a chamber is defined between the first surface and an abutment of the cursor on an elastic member side in which the counter-pressure (PB) of the low-pressure channel acts.

8. The hydraulic distributor according to claim 7, wherein said cursor has a further throttled passage which brings the chamber, into which the counter-pressure (PB) of the low-pressure channel acts, into communication with a third annular recess defined in the hole and also connected with the low-pressure channel.

9. The hydraulic distributor according to claim 1, wherein, inside the cursor, a hole is defined on a side opposite the first surface, a piston being slidable within said hole and having a first piston surface and a second piston surface, the first piston surface and the second piston surface being defined at ends of the piston, the first piston surface facing a side of the cursor, and the second piston surface facing an abutment of the cursor of a side opposite the elastic member.

10. The hydraulic distributor according to claim 9, wherein said cursor is slidable in a hole obtained inside a main body of the valve device, a first recess being configured to receive pressurized fluid through the second high-pressure line, and a second recess being connected with the low-pressure channel, and wherein said piston defines a further chamber between the first piston surface and the high-pressure area on which said high-pressure signal (P) acts, said further chamber being connected by one or more holes inside the slide at the first recess.

11. The hydraulic distributor according to claim 10, wherein the load sensing area and the second piston surface, together with the abutment of the cursor, define, inside the hole, a load sensing chamber.

12. The hydraulic distributor according to claim 11, wherein said further chamber and said load sensing chamber are separated by said piston, which is slidable within both the further chamber and the load sensing chamber.

13. The hydraulic distributor according to claim 1, further comprising at least one selector (S1, . . . Sn) configured to select the highest load sensing signal (LS) to be sent to the load sensing channel.

* * * * *